Sept. 14, 1965  N. KERN, JR  3,206,033
LIQUID DISPENSER FOR THE PURIFICATION
AND FILTRATION OF WATER
Filed March 22, 1962

INVENTOR.
NORMAN KERN, JR.

ATTORNEY 3,206,033
LIQUID DISPENSER FOR THE PURIFICATION AND FILTRATION OF WATER
Norman Kern, Jr., Lansdale, Pa., assignor to Met-Pro, Incorporated, Lansdale, Pa., a corporation of Pennsylvania
Filed Mar. 22, 1962, Ser. No. 181,712
1 Claim. (Cl. 260—249)

This invention relates to a liquid dispenser, and more particularly, to a liquid dispenser adapted to be utilized to provide a supply of purified and filtered water.

The liquid dispenser of the present invention is in the nature of a container having a removable top, a filter unit disposed within the container, and a valve means structurally interrelated with the filter unit and container whereby filtered water may be dispensed therefrom. The filter unit is designed so as to be a backwashed and reuseable or throw away unit. The dispenser of the present invention is particularly useful in areas where filtered water suitable for drinking is not readily available or has been temporarily shut off due to a disaster, epidemic, etc. When in use, the present invention will be capable of providing a supply of potable water.

The present invention is adapted to be utilized to provide a source of potable water from contaminated water. In general, a suitable bacteria killing agent such as a chloride or the like is first introduced into the container of contaminated water. The filter unit is structurally interrelated so that it will remove turbidity from the contaminated water.

It is an object of the present invention to provide a novel dispenser.

It is another object of the present invention to provide a simple, inexpensive purification and filtration dispenser particularly useful in areas where only a contaminated source of water is available.

It is another object of the present invention to provide a novel dispenser utilizing a novel filter unit.

It is another object of the present invention to provide a novel, lightweight, non-corrosive filtration dispenser.

Other objects will appear hereinafter.

For the purpose of illustrating the invention there is shown in the drawings a form which is presently preferred; it being understood, however, that this invention is not limited to the precise arrangements and instrumentalities shown.

Referring to the drawing in detail, wherein like numerals indicate like elments, there is shown in FIGURE 1 a dispenser designated generally as 10.

Figure 1:
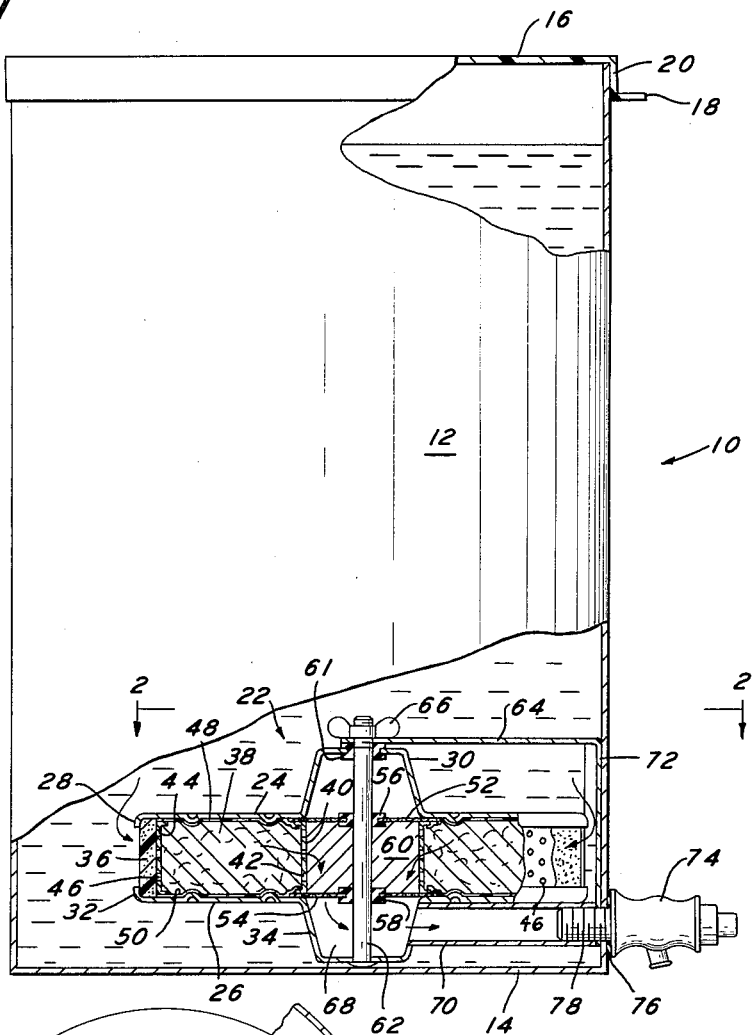
FIGURE 1 is a side elevation view of the dispenser of the present invention with portions broken away for purposes of illustration.
Figure 2:
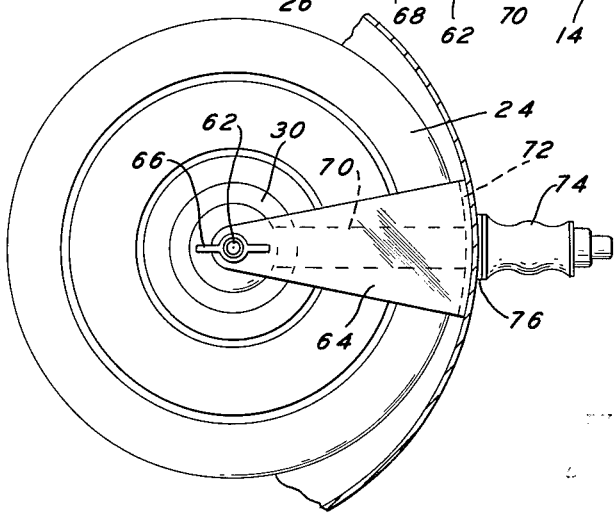
FIGURE 2 is a sectional view taken along the lines 2—2 in FIGURE 1.

The dispenser 10 includes a cylindrical container 12 having a bottom wall 14 and an open top. The open top is selectively closed by means of a cover 16. The container 12 is preferably made from a lightweight, non-corrosive material such as rigid plastic, aluminum, etc. The cover 16 is preferably made from a flexible plastic material. The cover is provided with a peripheral depending flange 20 which extends around the top edge of the container 12. The cover 16 may be provided with a finger engaging lifting tab 18 along a short portion of its periphery.

A filter unit designated generally as 22 is provided within the container 12. The filter unit 22 is provided with a top wall 24 disposed over and in spaced relationship with a bottom wall 26. The walls 24 and 26 are preferably made from a lightweight, non-corrosive material such as aluminum. The top wall 24 is provided with a depending peripheral flange 28 and a centrally disposed inverted cup-shaped portion 30. The bottom wall 26 is provided with an upstanding peripheral flange 32 and a centrally disposed cup-shaped portion 34.

The filter unit 22 includes an outer filter ring 36 radially inwardly of the flanges 28 and 32 and between the walls 24 and 26. The thickness of the ring 36 is less than the height thereof. The ring 36 is preferably a polystyrene foam commercially available from the Scott Paper Co. The filter unit 22 as will be made clear hereinafter and as illustrated in FIGURE 1, rests on the bottom wall of the container 12. In this regard, it will be noted that the outer filter ring 36 has its outer peripheral filtering surface disposed in a plane which is spaced from the bottom wall 14 of the container 12 thereby providing a sediment accumulation zone. This relationship is largely due to the provision of the central cup-shaped portion 34 on the bottom wall 26.

The filter unit 22 includes a cellulose acetate filtering material 38 disposed between annular filter retainer rings 40 and 44. The ring 40 is provided with a plurality of perforations 42. The ring 44 is provided with a plurality of perforations 46. The rings 40 and 44 are preferably made from a non-corrosive lightweight material such as aluminum, plastic, etc.

The ring 40 is provided with radially outwardly extending flanges at its top and bottom edges. The retainer ring 44 is provided with radially inwardly extending flanges at its top and bottom edges. These last mentioned flanges are spaced from the top and bottom walls 24 and 26 by imperforate plastic sheets of gasket material 48 and 50, respectively. The sheets of gasket material 48 and 50 provide a watertight seal between the flanges on the rings 40 and 44 and the top and bottom walls 24 and 26.

A top annular screen 52 overlies the central cup-shaped portion 30 and is disposed between the top wall 24 and the radially outwardly directed flange on the upper edge of the retainer ring 40. A bottom annular screen 54 overlies the central cup-shaped portion 34 and is disposed between the radially outwardly directed flange on the bottom edge of the ring 40 and the bottom wall 26. The screen 52 is provided with a central hole within which is disposed a rubber grommet 56. A similar grommet 58 is provided in a central portion of the screen 54.

A center stud 62 made from a non-corrosive material such as aluminum has one end secured to the bottom wall of the cup-shaped portion 34. The center stud 62 extends through the grommets 56 and 58, through a grommet 61 in the bottom wall of the cup-shaped portion 30, and through a hole in a bracket leg 64. A wing nut 66 made from a non-corrosive material such as stainless steel or the like is threadedly secured to the free end of the center stud 62 and maintains the filter unit 22 in assembled relationship.

The space between the screens 52 and 54 is substantially filled with a highly porous filter material 60 such as activated charcoal. The space within the cup-shaped portion 34 and below the screen 54 forms an outlet chamber 68 which is disposed within the filter unit 22. To prevent accumulation of stale water, the outlet chamber 68 is small enough so that less than one cup of water will be disposed therein. The outlet chamber 68 is in direct communication with an outlet conduit 70 extending from the cup-shaped portion 34 toward a peripheral wall of the cylindrical housing 12. The bracket leg 64 is integral with a bracket leg 72. The free end of the bracket leg 72 is provided with a hole in line with the flow passage through the conduit 70. A spigot made from a non-corrosive material is supported by the cylindrical housing 12 adjacent the bottom wall 14. The spigot 74 is provided with a reduced diameter inlet extension 78 which extends through a washer 76, a hole in the container wall, the hole in the bracket leg 72 and is threadedly secured to the inner peripheral surface of the conduit 70. The bracket legs 64 and 72 are preferably made integral from a rigid material capable of resisting forces which tend to increase the angle between the legs.

The filtering action is radially inwardly from the periphery of the filter unit 22 to the outlet chamber 68. Except for the provision for structure accommodating the center stud 62, the top and bottom walls 24 and 26 are imperforate. As shown more clearly in FIGURE 1, it will be noted that the filter unit 22 is juxtaposed to one side of the container 12 so that the bracket leg 72 is in abutting contact with the inner peripheral surface of the cylindrical wall of the cylindrical housing 12. Since the diameter of the filter unit 22 is substantially less than the diameter of the housing 12, a substantial amount of space is provided, at the lefthand end of FIGURE 1, to accommodate one's hands to manipulate, adjust or otherwise handle the filter unit 22.

The operation of the present invention is as follows:

The dispenser 10 is particularly useful in those areas where there is no ready supply of potable drinking water or when the available supply of potable drinking water is temporarily shut off. Brackish water will be poured or otherwise discharged into the open top of the housing 12. A material capable of killing bacteria such as sodium hypochlorite will be added to the water. Thereafter, the cover 16 will be placed over the open top.

It will be assumed that the filter unit 22 is disposed within the cylindrical housing 12 as illustrated in FIGURE 1. Any sediment in the water will accumulate on the bottom wall 14. Water will flow through the outer filter ring 36, through the perforations in the retainer ring 44, through the filter material 38, through the perforations in the retainer ring 40, through the activated charcoal 60, through the screen 54 and accumulate in the outlet chamber 68 and conduit 70. When the actuator on the spigot 74 is moved to an opened disposition, the filtered water will flow through the discharge spout on the spigot. The initial cup of water may be thrown away if the dispenser 10 of the present invention has not been used for a substantial period of time. As the water is removed through the discharge spout on the spigot 74, new filtered water flows through the filter unit as described above and replaces the water which has been removed. Hence, there is always a ready supply of approximately one cup of filtered water remaining in the outlet chamber 68 and conduit 70. Since the outer peripheral surface of the filter ring 36 lies in a plane which is substantially perpendicular to the plane of the bottom wall 14, sediment does not readily adhere thereto. The activated charcoal 60 will remove the chlorine taste of the bacteria killing agent which has been added to the contaminated water.

The space below the bottom wall 26 and above the bottom wall 14 permits accumulation of heavy solid particles which were suspended in the contaminated water. The filter unit 22 will remove all turbidity from the contaminated water. Turbidity will include solid particles, mucus, oil, etc. It will be appreciated that a wide variety of filtering materials may be substituted for the elements 36, 38 and 60. The element 60 is preferably an activated charcoal due to its ability to remove all traces of the bacteria killing agent which has been added to the contaminated water.

When the filter unit 22 becomes contaminated or clogged, the filter unit 22 may be disassembled by rotating and moving the wing nut 66 after the filter unit 22 has been removed from container 12. Thereafter, a new filter ring 36 and/or annular ring of filtering material 38 may be substituted. The entire filter unit 22 is capable of being removed by merely unscrewing the connection between the spigot 74 and the conduit 70. It is to be noted that the bracket legs 64 and 72 will be removed with the filter unit 22. In certain cases, when the filter unit 22 is not functioning properly, it may be more advantageous to remove the entire filter unit and replace the same with a new one. Since only one threaded connection is utilized to maintain the filter unit 22 in its operative disposition, the filter unit 22 is capable of being readily removed and replaced with a minimum amount of effort and time by an unskilled person.

It will be noted that the entire filter unit 22 rests on the bottom wall 14 of the cylindrical housing 12. The bracket legs 64 and 72 stabilize the filter unit 22 and oppose any buoyant forces exerted on the filter unit 22 thereby relieving stresses which would be imparted to the threaded engagement between the conduit 70 and the inlet extension 78. When a filter unit 22 has been completely removed from the operative disposition illustrated in FIGURE 1, the internal threads on the free end of the conduit 70 facilitates connecting the same to a source of pressurized water for backwashing the filter unit. Hence, it will be seen that the filtering elements 36 and 38 may be expendable or may be backwashed to clean the same as desired by the user.

The present invention may be embodied in other specific forms without departing from the spirit or essential attributes thereof and, accordingly, reference should be made to the appended claim, rather than to the foregoing specification as indicating the scope of the invention.

I claim:

A dispenser for filtering out turbidity from liquids comprising a container having a bottom, a selectively operable valve means coupled through said container adjacent said bottom, a filter unit within said container, said unit having overlying and spaced apart top and bottom imperforate walls, said bottom wall including a centrally disposed cup-shaped hollow portion depending therefrom, an outer annular filter between said top and bottom walls, a central core filter between said top and bottom walls, said cup-shaped hollow portion defining an outlet chamber below said central core filter, said cup-shaped portion spacing said filter unit from said bottom of said container and above sediment thereof thereby allowing liquid to percolate radially inwardly through said filter unit to the outlet chamber, conduit means communicating between said outlet chamber and valve means, said conduit means being a rigid conduit extending radially outwardly from said chamber to a threaded end engaging said valve means, a L-shaped bracket having one leg attached to said threaded end to bear against said container adjacent said valve means and another leg connected to a central portion of said top wall to counteract buoyant forces acting on said unit.

References Cited by the Examiner

UNITED STATES PATENTS

| | | | |
|---|---|---|---|
| 880,685 | 3/08 | Montanye | 210—484 X |
| 1,140,726 | 5/15 | Warden | 210—315 X |
| 2,060,320 | 11/36 | Jarmin | 210—249 |
| 2,288,426 | 6/42 | Stack | 210—489 |
| 2,597,217 | 5/52 | Zenick | 210—443 X |
| 2,694,743 | 11/54 | Ruskin et al. | |
| 2,966,960 | 1/61 | Rochlin | 210—496 X |
| 3,123,445 | 3/64 | Heath | 210—460 X |
| 3,132,501 | 5/64 | Jacobs et al. | |

FOREIGN PATENTS 809,796  8/54  Germany.

REUBEN FRIEDMAN, *Primary Examiner.*

HARRY B. THORNTON, HERBERT L. MARTIN,
*Examiners.*